United States Patent [19]

Crouch

[11] 4,006,100
[45] Feb. 1, 1977

[54] MANUFACTURE OF GASEOUS MIXTURES COMPRISING HYDROGEN AND CARBON MONOXIDE

[75] Inventor: William B. Crouch, Whittier, Calif.
[73] Assignee: Texaco Inc., New York, N.Y.
[22] Filed: Apr. 29, 1975
[21] Appl. No.: 572,775
[52] U.S. Cl. .................................. 252/373; 48/215
[51] Int. Cl.$^2$ ........................................... C01B 2/14
[58] Field of Search ....................... 52/373; 48/215

[56] References Cited
UNITED STATES PATENTS

| | | | |
|---|---|---|---|
| 3,545,926 | 12/1970 | Schlinger et al. | 252/373 X |
| 3,607,156 | 9/1971 | Schlinger et al. | 252/373 |
| 3,620,698 | 11/1971 | Schlinger et al. | 252/373 |
| 3,620,700 | 11/1971 | Schlinger et al. | 48/215 |
| 3,743,606 | 7/1973 | Marion et al. | 252/373 |
| 3,866,411 | 2/1975 | Marion et al. | 252/373 |

Primary Examiner—Howard T. Mars
Attorney, Agent, or Firm—T. H. Whaley; C. G. Ries; Albert Brent

[57] ABSTRACT

A liquid hydrocarbonaceous fuel in liquid phase is passed through the center conduit of an annulus-type burner at a linear velocity of one foot per second and below. Simultaneously, a gaseous mixture of substantially pure oxygen and steam is passed through the annulus passage. Upon impact between the two reactant streams at the tip of the burner, atomization of the liquid fuel takes place in the reaction zone of a free-flow noncatalytic partial oxidation gas generator. Mixtures of $H_2$ and CO are produced thereby unexpectedly containing 25 percent less entrained particulte carbon than that which is produced under similar conditions but with liquid fuel velocities of about 20 feet per second. The gaseous mixtures produced may be used as synthesis gas, reducing gas, or fuel gas.

4 Claims, No Drawings

MANUFACTURE OF GASEOUS MIXTURES COMPRISING HYDROGEN AND CARBON MONOXIDE

BACKGROUND OF THE INVENTION

1. Field of the Invention

This invention relates to a continuous process for the generation of gaseous mixtures comprising $H_2$, CO, $CO_2$, and $H_2O$ e.g. synthesis gas, reducing gas, or fuel gas by the partial oxidation of a liquid hydrocarbonaceous fuel.

2. Description of the Prior Art

Single and double annulus-type burners have been used previously for introducing streams of reactants into a partial oxidation synthesis gas generator. For example, in coassigned U.S. Pat. No. 3,545,926 — Schlinger et al. an oil stream is disclosed being passed through the central conduit of a single annulus-type burner at a velocity in the range of about 5 to 40 feet per second and a converging annular stream of oxygen and steam is discharged through the annulus at a velocity of about 200 to 400 feet per second. In coassigned U.S. Pat. No. 3,743,606 — Marion et al., an oil stream is disclosed being passed through the central conduit of a double annulus-type burner at a velocity of 10–100 feet per second, a free-oxygen containing gas is passed through the inner annulus at a velocity of 110 ft. per sec. —sonic velocity, and a temperature moderating gas is passed through the outer annulus at 55 ft. per sec. to sonic velocity.

Ordinarily, one would prefer introducing oil through an annulus type burner at high velocity in order to decrease the size of the burner and to promote better mixing.

SUMMARY

The combustion efficiency in the noncatalytic partial oxidation process for making gaseous mixtures comprising $H_2$, CO, $CO_2$, $H_2O$, particulate carbon and impurities selected from the group consisting of $CH_4$, COS, $H_2S$, A, $N_2$, and mixtures thereof is increased unexpectedly by 25% by continuously passing through the central conduit of an annulus-type burner a stream of liquid hydrocarbonaceous fuel in liquid phase at 0.1 to 1.0 foot per second, simultaneously passing through the annular passage of said burner at a velocity in the range of about 50 feet per second to sonic velocity a stream of free-oxygen containing gas in admixture with a temperature moderator e.g. $H_2O$ or $CO_2$, impinging said reactant streams together so as to produce an atomized mixture in which the ratio of atoms of free-oxygen to atoms of carbon in the fuel is in the range of about 0.6 to 1.5, and reacting said atomized mixture by partial oxidation at a temperature in the range of about 1500° to 3500° F. and a pressure in the range of about 1 to 250 atmospheres to produce said gaseous mixture.

DESCRIPTION OF THE INVENTION

The method of the invention is generally applicable to annulus-type burner constructions and preferably to single annulus-type burners known for use in the partial oxidation of hydrocarbonaceous fuels with oxygen. These burners mix the separate streams of reactants together to produce a uniform mixture which is then reacted by partial oxidation in the reaction zone of the the gas generator. The burners consist in general of a plurality of concentrically arranged tubes. Reference is made to coassigned U.S. Pat. No. 3,545,926 — Schlinger et al. showing a typical free-flow synthesis gas generator with a suitable axially aligned burner mounted in the upper head.

In a preferred embodiment of my invention, the mixer-burner comprises a central coaxial cylindrical conduit with an upstream flanged inlet for introducing the liquid hydrocarbonaceous fuel. The downstream tip portion of the central conduit is preferably shaped into a converging conical nozzle. Surrounding said central conduit is an outer coaxial conduit with an upstream flanged inlet for introducing mixtures of free-oxygen containing gas and temperature moderator and having a converging frustoconical shaped nozzle at the downstream tip. Said outer conduit is longitudinally and radially spaced from said central conduit to provide an annular shaped conduit therebetween for the passage of said free-oxygen containing gas mixture. Optionally, a water jacketed face plate may be provided at the burner tip to cool the outer converging nozzle, as shown in coassigned U.S. Pat. No. 2,928,460 —Eastman et al. External flanges are provided for mounting the burner in the top of a vertical free-flow gas generator in axial alignment thereto. The tip of the burner extends to the upper end of the reaction zone.

The liquid hydrocarbonaceous stream in liquid phase is preferably introduced through the central conduit. Simultaneously, the stream of free-oxygen containing gas stream in admixture with the temperature moderator is introduced through the annulus passage at a relatively high velocity. The comparatively high velocity gaseous stream in the annulus converging at an acute conical angle e.g. 15° to 75° to the burner axis impacts the liquid hydrocarbon fuel being discharged from the central nozzle at the tip of the burner. As a result, the liquid hydrocarbon fuel is subjected to a shearing action by which it is first torn into ligaments and then atomized into fine droplets. The droplets form a mist downstream, finely dispersed in the free-oxygen containing gas and temperature moderator, and of such minuteness as to provide an intimacy of contact favorable for subsequent oxidation.

The noncatalytic parial oxidation reaction takes place as the reactants pass through an unobstructed free-flow refractory-lined reaction zone of a vertical steel pressure vessel. The reaction time is about 0.5 to 8 seconds. The autogenous temperature in the reaction zone is in the range of about 1500° to 3500° F and the pressure is in the range of about 1 to 250 atmospheres.

The effluent gas stream from the gas generator has the following composition in mole % $H_2$ 20 to 70; CO 60 to 20; $CO_2$ 3 to 8; $H_2O$ 5–15; $CH_4$ nil to 15; $N_2$ nil-60; $H_2S$ nil to 2.0; COS nil to 0.2; A nil to 2; and from 0.2 to 20 wt. % of particulate carbon (basis weight of C in the hydrocarbonaceous fuel).

It was unexpectedly found that the gasification efficiency of the process is increased when the linear velocity of the oil being introduced by way of the central passage of the burner is decreased while the linear velocity of the stream of oxygen-stream being passed simultaneously through the annular passage is held nearly constant.

In fact inner (liquid) tip velocities of about one foot per second or less produced unreacted carbon yields of three-quarters of the yields produced when using inner tip velocities in the range of 20 foot per second at constant mass flow. Preferably, the linear velocity of the liquid hydrocarbonaceous fuel is in the range of about 0.1 to 1 foot per second. The velocity of the mixture of free-oxygen containing gas and temperature moderator passing through the annulus passage is in the range of about 50 feet per second to sonic velocity.

The liquid hydrocarbonaceous fuel may be introduced into the gas generator at a temperature in the range of ambient to below the vaporization temperature, e.g. about 500° F.

The term liquid hydrocarbonaceous fuel as used herein is intended to mean by definition petroleum distillate and residua, gas oil, residual fuel, reduced crude, whole crude, asphalt, coal tar, coal oil, shale oil, and tar sand oil, and mixtures thereof. An economic advantage is obtained when low cost sulfur containing petroleum fuels having an I.B.P. in the range of 400° to 900° F and with a sulfur content in the range of about 1 to 7 wt. % are used. Included also by definition as liquid hydrocarbonaceous fuels are pumpable slurries of solid carbonaceous fuels e.g. coal, coal char, particulate carbon, petroleum coke, and mixtures thereof in a liquid hydrocarbonaceous fuel such as one previously listed. Further, included also by definition as a liquid hydrocarbonaceous fuel are liquid oxygenated hydrocarbonaceous materials i.e. liquid hydrocarbon materials containing combined oxygen, including alcohols, ketones, aldehydes, organic acids, esters, ethers, and mixtures thereof. Further, a liquid oxygenated hydrocarbonaceous material may be in admixture with one of said liquid petroleum materials.

The term free-oxygen containing gas as used herein includes by definition air, oxygen-enriched air, i.e. greater than 21 mole % oxygen, and substantially pure oxygen, i.e. greater than 95 mole % oxygen (the remainder comprising $N_2$ and rare gases). Free-oxygen containing gas may be introduced into the burner at a temperature in the range of about ambient to 1800° F. The ratio of free-oxygen in the oxidant to carbon in the feedstock (O/C atom/atom) is preferably in the range of about 0.6 to 1.5. Substantially pure oxygen is preferred to minimize introducing nitrogen and other gaseous impurities into the synthesis gas.

The term temperature moderator as used herein includes by definition $H_2O$, $CO_2$, flue gas, and mixtures thereof. $H_2O$ is the preferred temperature moderator. With steam as the temperature moderator, the weight ratio of steam/liquid hydrocarbonaceous fuel is in the range of about 0.2 to 2.0, i.e. 0.2 to 2.0 parts by weight of steam per part by weight of fuel.

EXAMPLES

Synthesis gas is generated in an unpacked free-flow refractory lined reactor by the noncatalytic partial oxidation of fuel oil with substantially pure oxygen (95 mole % $O_2$ or higher) and steam. The internal volume of the combustion chamber of the gas generator is 63.4 cubic feet.

The fuel oil supplied to the synthesis gas generator has the following characteristics:

| | |
|---|---|
| Gravity, ° API | 13.4 |
| Ultimate Analysis, Wt. percent | |
| Carbon | 85.5 |
| Hydrogen | 11.3 |
| Sulfur | 2.2 |
| Nitrogen | .9 |
| Oxygen | .1 |
| Heating Value, B.T.U./lb | 18367 |

The fuel oil at a temperature of 200° F is passed through the central conduit of an annulus-type burner. The mixture of substantially pure oxygen and steam at a temperature of 360° F is passed through the annulus passage. The oil stream velocity in runs 1 to 4 below is decreased by increasing the stream diameter at constant mass flow rate. A summary of the operating conditions and performance is shown in Table I below.

TABLE I

| | Run No. | | | |
|---|---|---|---|---|
| | 1 | 2 | 3 | 4 |
| Velocity through Burner | | | | |
| Oil, Ft./Sec. (Central Conduit) | 1 | 1.5 | 5 | 20 |
| $O_2$-Steam, Ft./Sec. (Annulus Passage) | 900 | 900 | 900 | 900 |
| Feed Rates: | | | | |
| Oil, lbs./hr. | 1000 | 1000 | 1000 | 1000 |
| Oxygen (99 mole % $O_2$), SCFH | 14080 | 14080 | 14080 | 14080 |
| Steam, lbs./hr. | 250 | 250 | 250 | 250 |
| Steam/Oil, lbs/lb. | .250 | .250 | .250 | .250 |
| Oxygen/Oil, SCF/lb. | 14.1 | 14.1 | 14.1 | 14.1 |
| Oxygen/Carbon, atom/atom | 1.04 | 1.04 | 1.04 | 1.04 |
| Reaction Zone | | | | |
| Temperature, ° F. | 2438 | 2444 | 2456 | 2459 |
| Pressure, Atmospheres | 30 | 30 | 30 | 30 |
| Product Gas Composition (Dry Mole %) | | | | |
| Hydrogen | 44.13 | 44.13 | 44.12 | 44.12 |
| Carbon Monoxide | 51.17 | 51.14 | 51.11 | 51.10 |
| Carbon Dioxide | 3.83 | 3.85 | 3.89 | 3.90 |
| Hydrogen Sulfide | .51 | .51 | .51 | .51 |
| Carbonyl Sulfide | .03 | .03 | .03 | .03 |
| Methane | — | — | — | — |
| Nitrogen | .25 | .25 | .25 | .25 |
| Argon | .09 | .09 | .09 | .09 |
| Particulate Carbon Wt. % (basis C in Feed) | 1.88 | 2.07 | 2.40 | 2.50 |
| Oxygen Consumed | | | | |
| Cu. Ft./M Cu. Ft. $H_2$+ CO | 305.6 | 306.3 | 307.5 | 307.9 |
| Cold Gas Efficiency | | | | |
| Heating Value of $H_2$+ CO, % of Fuel Used | 80.56 | 80.37 | 80.06 | 79.97 |

From Table I, it may be shown that the wt. % particulate carbon in the product gas stream varies directly with the velocity of the oil stream through the central conduit of the annulus type burner. Further, there is about 25% less carbon produced in run 1 when the velocity is 1 ft. per sec. in comparison with that produced in run 4 when the velocity is 20 ft. per sec.

A reduction of carbon content in the effluent gas stream from the gas generator shows an improved combustion efficiency. In comparison with conventional processing the consumption of oxygen per standard cubic feet (SCF) of product gas may be decreased 1.9% by the subject process at a great economic savings. Alternatively, additional processing of the effluent gas to remove particulate carbon may be eliminated or reduced. In such case, carbon-removal equipment may be substantially reduced in size. The Cold Gas Effic. is greater for Run 1.

The process of the invention has been described generally and by example with reference to an oil feedstock of particular composition for purposes of clarity and illustration only. It will be apparent to those skilled in the art from the foregoing that various modifications of the process and the materials disclosed herein can be made without departure for the spirit of the invention.

I claim:

1. In the manufacture of a product gas mixture comprising $H_2$, CO, $CO_2$, $H_2O$ together with particulate carbon and impurities selected from the group consisting of $CH_4$, COS, $H_2S$, A, $N_2$, and mixtures thereof by the partial oxidation of a liquid hydrocarbonaceous fuel selected from the group consisting of petroleum distillate and residua, gas oil, residual fuel, reduced crude, whole crude, asphalt, coal tar, coal oil, shale oil, tar sand oil, and mixtures thereof with a free-oxygen containing gas in the reaction zone of a free-flow noncatalytic gas generator at a pressure in the range of about 1 to 250 atmospheres and an autogenous temperature in the range of about 1500° to 3500° F, and wherein said reactants are introduced into the reaction zone of said gas generator by way of a annulus-type burner having a central coaxial cylindrical conduit, an outer coaxial conduit with a converging nozzle at the downstream tip of the burner, said outer conduit surrounding said central conduit and being longitudinally and radially spaced therefrom so as to provide an annular passage therebetween, the improvement which comprises passing through said central conduit of said annulus-type burner a stream of said liquid hydrocarbonaceous fuel in liquid phase at a velocity in the range of about 0.1 to 1 foot per second, simultaneously passing through said annular passage at a velocity in the range of about 50 feet per second to sonic velocity a stream of free-oxygen containing gas in admixture with a temperature moderator; impinging said streams together so as to produce an atomized mixture in which the atomic ratio of free-oxygen to carbon in the fuel is in the range of about 0.6 to 1.5; and reacting said atomized mixture to produce said product gas mixture.

2. The process of claim 1 wherein said free-oxygen containing gas is selected from the group consisting of air, oxygen-enriched air, i.e. greater than 21 mole % oxygen, and substantially pure oxygen, i.e. greater than 95 mole % oxygen (the remainder comprising $N_2$ and rare gases).

3. The process of claim 1 wherein said temperature moderator is selected from the group consisting of $H_2O$, $CO_2$, flue gas, and mixtures thereof.

4. In the manufacture of a product gas mixture comprising $H_2$, CO, $CO_2$, $H_2O$ together with particulate carbon and impurities selected from the group consisting of $CH_4$, COS, $H_2S$, A, $N_2$, and mixtures thereof by the partial oxidation of petroleum oil with substatially pure oxygen in admixture with a temperature moderator in the reaction zone of a free-flow noncatalytic gas generator at a pressure in the range of about 1 to 250 atmospheres and an autogenous temperature in the range of about 1500° to 3500° F, and wherein said reactants are introduced into the reaction zone of said gas generator by way of an annulus-type burner having a central coaxial cylindrical conduit, an outer coaxial conduit with a converging nozzle at the downstream tip of the burner, said outer conduit surrounding said central conduit and being longitudinally and radially spaced therefrom so as to provide an annular passage therebetween, the improvement which comprises passing through said central conduit of said annulus-type burner a stream of said petroleum oil in liquid phase at a velocity in the range of about 0.1 to 1 foot per second, and at a temperature in the range of ambient to below its vaporization temperature; simultaneously passing through said annular passage at a velocity in the range of about 50 feet per second to sonic velocity a stream of substantially pure oxygen in admixture with steam; impinging said streams together so as to produce an atomized mixture in which the atomic ratio of free-oxygen to carbon in the fuel is in the range of about 0.6 to 1.5, and the weight ratio of steam/petroleum oil is in the range of about 0.2 to 2.0; and reacting said atomized mixture by partial oxidation to produce said product gas mixture.

* * * * *